(12) United States Patent
Agata et al.

(10) Patent No.: US 10,146,019 B2
(45) Date of Patent: Dec. 4, 2018

(54) OPTICAL CONNECTOR RETAINING UNIT AND OPTICAL WIRING UNIT

(71) Applicant: FUJIKURA LTD., Tokyo (JP)

(72) Inventors: Katsushi Agata, Sakura (JP); Norihiro Momotsu, Sakura (JP); Terutake Kobayashi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/863,270

(22) Filed: Jan. 5, 2018

(65) Prior Publication Data

US 2018/0196204 A1 Jul. 12, 2018

(30) Foreign Application Priority Data

Jan. 10, 2017 (JP) .................................. 2017-001576

(51) Int. Cl.
*G02B 6/38* (2006.01)
*G02B 5/02* (2006.01)

(52) U.S. Cl.
CPC ......... *G02B 6/3895* (2013.01); *G02B 5/0284* (2013.01); *G02B 6/3825* (2013.01); *G02B 6/3879* (2013.01); *G02B 6/3897* (2013.01)

(58) Field of Classification Search
None
See application file for complete search history.

(56) References Cited

U.S. PATENT DOCUMENTS

| | | | | |
|---|---|---|---|---|
| 6,256,443 B1* | 7/2001 | Uruno | .................. | G02B 6/4452 385/134 |
| 6,470,114 B1* | 10/2002 | Kloth | ..................... | G02B 6/381 385/18 |
| 2007/0217749 A1* | 9/2007 | Jong | .................... | G02B 6/3849 385/88 |

(Continued)

FOREIGN PATENT DOCUMENTS

| | | | |
|---|---|---|---|
| CN | 104375243 A | | 2/2015 |
| GB | 2248122 A | * | 3/1992 |
| JP | 2000-28475 A | * | 1/2000 |

(Continued)

OTHER PUBLICATIONS

Japanese Industrial Standards, "F04 Type Connectors for Optical Fiber Cables (Type SC Connectors)," JIS C 5973, 2014 (10 pages).

(Continued)

*Primary Examiner* — Michael Stahl
(74) *Attorney, Agent, or Firm* — Osha Liang LLP

(57) ABSTRACT

An optical connector retaining unit includes: an optical connector retaining member that retains an optical connector of a distal end of an optical fiber in a connection standby state being optically connected to nothing; and a reflecting section that reflects visible light emitted from the distal end of the optical fiber after led into a proximal end of the optical fiber opposite to the distal end thereof provided with the optical connector, at an inclination angle of 45 degrees or less with respect to an optical axis of the emitted visible light, or a scattering section that scatters visible light emitted (Continued)

from the distal end of the optical fiber such that scattered light includes light within the inclination angle of 45 degrees or less with respect to the optical axis of the emitted visible light.

5 Claims, 8 Drawing Sheets

(56) References Cited

U.S. PATENT DOCUMENTS

| | | |
|---|---|---|
| 2013/0209048 A1 | 8/2013 | Vleugels |
| 2017/0097485 A1* | 4/2017 | Yang .................... G02B 6/4296 |

FOREIGN PATENT DOCUMENTS

| | | |
|---|---|---|
| JP | 2001-057683 A | 2/2001 |
| JP | 2007-514964 A | 6/2007 |
| JP | 2009-175612 A | 8/2009 |
| JP | 5003969 B2 | 8/2012 |
| JP | 2017-117718 A | 6/2017 |

OTHER PUBLICATIONS

Japan Industrial Standards, "F14Type connectors for optical fiber cables (Type MU connector)," JIS C 5983, 2014, cited with partial English translation (64 pages).
Office Action issued in corresponding Japanese Application No. 2017-001576 dated Aug. 7, 2018 (3 pages).
Notice of Allowance issued in corresponding Japanese Patent Application No. 2017-001576 dated Oct. 2, 2018 (3 pages).

\* cited by examiner

OPTICAL CONNECTOR RETAINING UNIT AND OPTICAL WIRING UNIT

CROSS-REFERENCE TO RELATED APPLICATION

Priority is claimed on Japanese Patent Application No. 2017-001576, filed Jan. 10, 2017, the content of which is incorporated herein by reference.

BACKGROUND

Field of the Invention

The present invention relates to an optical connector retaining unit and an optical wiring unit.

Description of Related Art

In retaining boards in the related art, in order to check a laser beam for identification (hereinafter referred to as an "identification laser beam"), it is necessary to extract all optical connectors from the retaining boards, view end surfaces of the optical connectors, and check the identification laser beam.

Many usual optical fiber cord accommodation casings or the like have 100 or more optical connectors mounted thereon, and thus it is necessary to take out the optical connectors from the retaining boards one by one and check an identification laser beam. There may be also a risk for a checker of looking directly at an identification laser beam and the operation time may become also long.

Also, in the related art, examples of techniques associated with fiber identification for a large number of optical fibers include techniques disclosed in Japanese Unexamined Patent Application, First Publication No. 2009-175612 (hereinafter, Patent Document 1) and Japanese Patent No. 5003969 (hereinafter, Patent Document 2).

An optical connector 20 shown in FIG. 2(A) of Patent Document 1 includes a fiber connection section 27 obtained by abutting and connecting an optical fiber core wire 21 onto a short optical fiber 21b inserted and fixed into a distal end side of a ferrule 22, the fiber connection section 27 being accommodated in a connector casing, and a window 26, through which light leaking from the fiber connection section 27 is emitted outside the connector casing, being provided in the connector casing. The optical connector 20 can emit a part of visible light, which has been sent to the optical fiber core wire 21, from the fiber connection section 27 to the outside of the connector casing through the window 26 of the connector casing. Note that a ferrule made of crystallized glass or the like is used for the ferrule 22 of the optical connector 20 to secure light transmission properties and light scattering properties.

An optical connector 20 shown in FIG. 2(A) of Patent Document 2 is obtained by providing a slit 27 in a glass fiber 21a inserted into a ferrule 22 and providing a window 26 in a connector casing such that visible light leaking from the slit 27 is emitted to the outside of the optical connector 20. The optical connector 20 can emit a part of visible light sent to an optical fiber core wire 21 to the outside of the connector casing through the window 26 of the connector casing. A ferrule made of crystallized glass or the like is used for the ferrule 22 of the optical connector 20 to secure light transmission properties and light scattering properties.

In the techniques disclosed in Patent Documents 1 and 2, in a state in which optical connectors are connected to optical connector adapters (connecting adapters in Patent Documents 1 and 2), fiber identification can be performed using visible light emitted to the outside of the connector casings through the windows 26 of the connector casings. Many retaining boards use optical connector adapters for the purpose of holding optical connectors. For this reason, visible light from the windows 26 of the connector casings can be used for fiber identification while the optical connectors disclosed in Patent Documents 1 and 2 are held in the optical connector adapters of the retaining boards.

However, in the devices disclosed in Patent Documents 1 and 2, it may be difficult to visually recognize light (visible light) emitted outside of connector casings through windows of connector casings because the light (visible light) is weak in some cases. For this reason, it may be difficult to use visual recognition of visible light emitted outside of a connector casing from a window for fiber identification in some cases.

SUMMARY

One or more embodiments of the present invention provide an optical connector retaining unit capable of improving the visibility of identification light emitted from an optical connector and of reliably and easily performing fiber identification and to provide an optical wiring unit using the optical connector retaining unit.

An optical connector retaining unit according to one or more embodiments may include: an optical connector retaining member configured to retain an optical connector of a distal end of an optical fiber in a connection standby state being optically connected to nothing; and a reflecting section capable of reflecting visible light, which is emitted from the distal end of the optical fiber after led into a proximal end of the optical fiber opposite to the distal end thereof provided with the optical connector, at an inclination angle of 45 degrees or less with respect to an optical axis of the emitted visible light or a scattering section configured to scatter visible light emitted from the distal end of the optical fiber such that scattered light includes light within an inclination angle of 45 degrees or less with respect to the optical axis of the emitted visible light.

An optical connector retaining unit according to one or more embodiments may further include: an optical path changing section supporting member provided with the reflecting section or the scattering section, wherein the optical connector retaining member is rotatable with respect to the optical path changing section supporting member around a central axis in a direction intersecting the optical axis.

According to one or more embodiments, a plurality of connector engagement sections with which optical connectors of distal ends of optical fibers are engaged and are arranged on the optical connector retaining member along the central axis.

According to one or more embodiments, a plurality of optical connector retaining members are provided such that central axes of the plurality of optical connector retaining members extend to be parallel to each other at intervals in an upward and downward direction.

According to one or more embodiments, the optical connector retaining member is a light transmitting connector retaining member formed to be able to transmit the visible light emitted from the distal end of the optical fiber and formed with a connector engagement hole with which the optical connector is engaged, and the reflecting section or the scattering section is provided inside the light transmitting connector retaining member or on the optical axis of a rear surface side of the light transmitting connector retaining member.

An optical wiring unit according to one or more embodiments may include: the optical connector retaining unit according to any one of the first to fifth aspects; and an adapter array section to which an optical connector of a distal end of an optical fiber not retained in the optical connector retaining unit is connected.

With an optical connector retaining unit and an optical wiring unit according to one or more embodiments of the present invention, reflected light obtained by reflecting visible light sent from a proximal end of an optical fiber and emitted from a distal end of the optical fiber by a reflecting section or scattered light obtained by scattering the visible light by a scattering section can be used for fiber identification. A much larger amount of outgoing light (visible light) from the distal end of the optical fiber can be secured than that of light leaking from the fiber connection sections of the optical connectors disclosed in Patent Documents 1 and 2. For this reason, the optical connector retaining unit and the optical wiring unit according to one or more embodiments of the present invention can improve the visibility of control light emitted from the optical connectors as compared to a constitution in which light leaking from the fiber connection sections is visually recognized outside of the connector casings like in Patent Documents 1 and 2, and thus fiber identification can be performed reliably and easily.

DETAILED DESCRIPTION

Hereinafter, embodiments of the present invention will be described with reference to the drawings. In the following description, simplification of illustration such as appropriate omission of a part of constituent elements, simplification of shapes, and a change in scale may be performed to facilitate the understanding of the invention in some cases. Furthermore, positional relationships between constituent elements will be described by setting an XYZ orthogonal coordinate system. In the XYZ orthogonal coordinate system, description will be provided by setting an X direction, a Y direction, and a Z direction to a rightward and leftward direction, a forward and rearward direction, and an upward and downward direction, respectively.

<Entire Optical Connector Retaining Unit>

Figure 1:
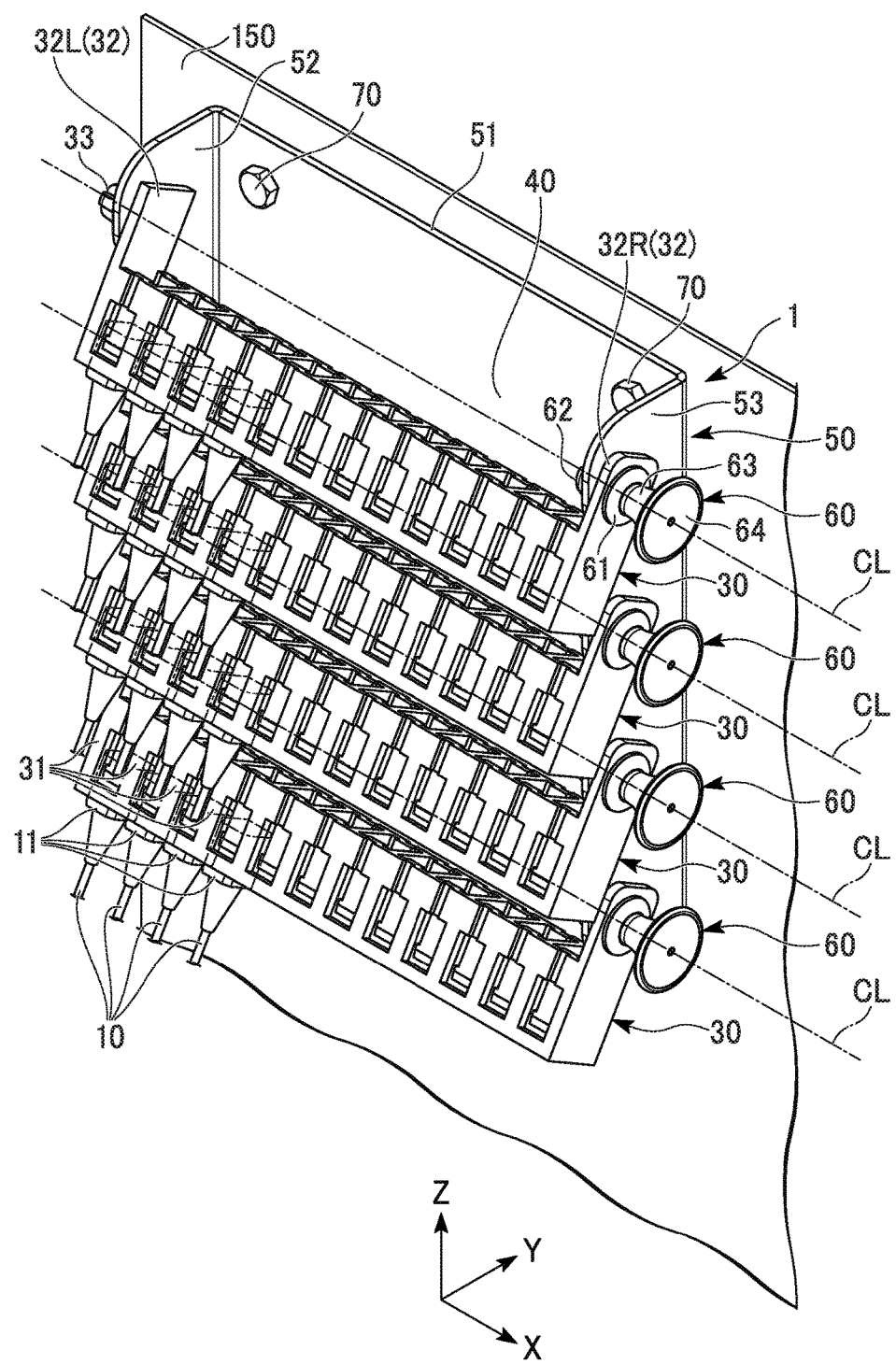
FIG. 1 is a perspective view of an optical connector retaining unit according to one or more embodiments.

FIG. 1 shows an optical connector retaining unit 1 according to one or more embodiments.

As shown in FIG. 1, the optical connector retaining unit 1 is provided on a lid part 150 of an optical connection box 100 (refer to FIG. 10) which will be described below. The optical connector retaining unit 1 includes a plurality of optical connector retaining members 30, a bracket 50 configured to rotatably support the plurality of optical connector retaining members 30, a reflecting section 40 configured to reflect visible light, and rotating members 60 used to manually rotate the optical connector retaining members 30 around central axes CL with respect to the bracket 50. In one or more embodiments, the bracket 50 supports the optical connector retaining members 30 such that they are rotatable around the central axes CL in a horizontal direction (the rightward and leftward direction in FIG. 1). Hereinafter, the central axes CL are also referred to as "rotating axes CL" or "retaining member rotating axes CL."

<Optical Connector Retaining Members>

In one or more embodiments, the optical connector retaining unit 1 includes four optical connector retaining members 30. The four optical connector retaining members 30 are provided such that rotating axes CL thereof extend to be parallel to each other at intervals in the upward and downward direction.

In optical fibers 10 extending from a fiber guide section 130 (refer to FIG. 10) which will be described below, the optical connector retaining members 30 retain optical connectors 11 of distal ends of the optical fibers 10 in a connection standby state of being optically connected (connector-connected) to nothing. Hereinafter, optical connectors 11 retained by the optical connector retaining members 30 are also referred to as "retained optical connectors 11" and optical fibers 10 having distal ends in which the light retaining connectors 11 are provided are also referred to as "retained optical fibers 10."

In one or more embodiments, the optical fibers 10 are single-core optical fiber cords accommodating single-core optical fiber core wires. For example, single-core optical connectors such as SC type optical connectors (products conforming as F04 type optical connectors stipulated in JIS C 5973 or products conforming to IEC 61754-4 (or IEC 60874-14)) and MU type optical connectors (products conforming as F14 type optical connectors stipulated in JIS C 5983 or products conforming to IEC 61754-6) are used as the optical connectors 11 of the distal ends of the optical fibers 10.

Figure 2:
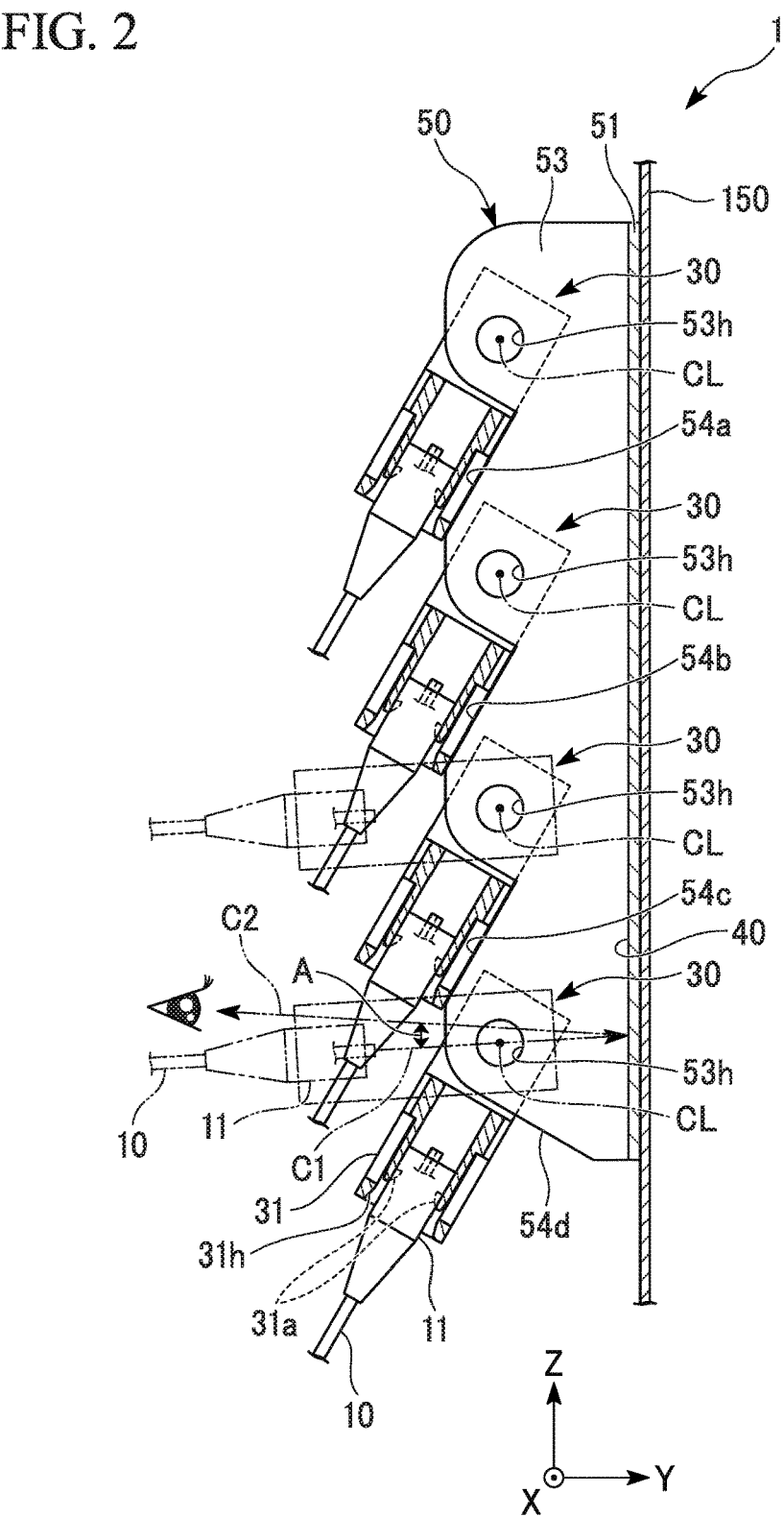
FIG. 2 is a diagram showing a cross-sectional view taken along line II-II of FIG. 10 and a diagram showing an action of a reflecting section according to one or more embodiments.

In one or more embodiments, the optical connector retaining members 30 are formed of a transparent member such as a transparent resin. As shown in FIG. 2, connector engagement holes 31h into which the light retaining connectors 11 can be inserted and engaged are formed in the optical connector retaining members 30. Each of the connector engagement holes 31h of the optical connector retaining members 30 shown in FIG. 2 is a through hole which passes through each of the optical connector retaining members 30. Here, the connector engagement holes 31h are not limited to a through hole which passes through the optical connector retaining member 30 and may be a non-through hole in which an opposite side (hereinafter also referred to as a "rear side") of the connector engagement hole 31h in an axial direction thereof from a connector insertion slot through which the optical connectors 11 are inserted and removed is closed. Here, the non-through hole may be configured such that the rear side of the connector engagement hole is closed by a light transmitting member (for example, a part of the optical connector retaining member 30).

Also, a plurality of connector engagement sections 31 configured to include locking claws 31a provided inside the connector engagement holes 31h and configured to be engaged with and detached from the optical connectors 11 are formed and arranged in the optical connector retaining member 30 along the retaining member rotating axis CL. In one or more embodiments, twelve connector engagement sections 31 are linearly arranged in each optical connector retaining member 30 along the retaining member rotating axis CL. Although FIG. 2 is a diagram showing a cross-sectional view taken along the line II-II of FIG. 10, a cross section obtained by cutting the connector engagement sections 31 using a YZ virtual plane is also shown.

In the present specification, with regard to the optical connector retaining members, sides at which the connector insertion slots of the connector engagement holes are open are regarded to be front surface sides and sides opposite to the front surface sides are regarded to be rear surface sides. The same applies to a light transmitting connector retaining member which will be described below.

The connector engagement sections 31 and the optical connectors 11 inserted into and engaged with the connector engagement sections 31 constitute the same slide lock mechanisms as a mechanism constituted of the optical connectors 11 and optical connector adapters conforming thereto. The optical connectors 11 can be inserted into and removed from the connector engagement sections 31.

A pair of left and right extending pieces 32 (left extending pieces 32L and right extending pieces 32R) extending outward (upward) from both ends (left and right ends) in directions along the rotating axes CL are provided on the optical connector retaining members 30. The left extending pieces 32L are integrally formed with left side portions of the connector engagement sections 31 located at leftmost ends among the plurality of connector engagement sections 31. The right extending pieces 32R are integrally formed with right side portions of the connector engagement sections 31 located at rightmost ends among the plurality of connector engagement sections 31. Convex sections 33 protruding from the left surfaces thereof to the left along the retaining member rotating axes CL are provided on the left extending pieces 32L. Although not shown in the drawings, through holes which are open on the retaining member rotating axes CL in a thickness direction of the right extending pieces 32R are formed in the right extending pieces 32R.

<Bracket>

In one or more embodiments, the bracket 50 includes a rectangular-plate-shaped rear wall 51 fixed to the lid part 150 using fastening members 70 such as bolts and protrusion walls 52 and 53 (a left wall 52 and a right wall 53) protruding from left and right end portions of the rear wall 51 to a side opposite to the lid part 150. The protrusion walls 52 and 53 vertically protrude from the rear wall 51 and are formed in a plate shape extending in the upward and downward direction. The bracket 50 according to one or more embodiments is formed by bending one metal plate.

The reflecting section 40 is provided on the rear wall 51 of the bracket 50. In one or more embodiments, the rear wall 51 functions as an optical path changing section supporting member provided with the reflecting section 40.

A plurality of through holes which are open on the retaining member rotating axes CL in thickness directions of the left wall 52 and the right wall 53 are formed in the left wall 52 and the right wall 53. In FIG. 2, for convenience, through holes 53h formed in the right wall 53 are shown. In one or more embodiments, four through holes vertically arranged at intervals are formed in each of the left wall 52 and the right wall 53. As shown in FIG. 1, the convex sections 33 protruding from the left extending pieces 32L of the optical connector retaining members 30 are rotatably inserted into the through holes (not shown) of the left wall 52.

The left wall 52 is located on the left side of the left extending pieces 32L of the optical connector retaining members 30. The right wall 53 is located on the left side of the right extending pieces 32R of the optical connector retaining members 30. As shown in FIG. 2, a plurality of inclined surfaces is provided on the left wall 52 and the right wall 53. In FIG. 2, for convenience, inclined surfaces 54a to 54d provided on the right wall 53 are shown. In one or more embodiments, four inclined surfaces 54a to 54d are provided on each of the left wall 52 and the right wall 53. To be specific, three front lower inclined surfaces 54a to 54c which are inclined such that lower sides thereof are in front of upper sides thereof and one rear lower inclined surface 54d which is inclined such that a lower side thereof is behind an upper side thereof are provided on the left wall 52 and the right wall 53.

In initial states indicated by solid lines of FIG. 2, parts of the optical connector retaining members 30 are in contact with the inclined surfaces 54a to 54d. Here, the initial states refer to stopped states before the optical connector retaining members 30 are rotated around the rotating axes CL with respect to the bracket 50.

To be specific, rear surfaces of three optical connector retaining members 30 from the top among the four optical connector retaining members 30 come into contact with the front lower inclined surfaces 54a to 54c of the right wall 53 and an upper end of a fourth optical connector retaining member 30 from the top (a first optical connector retaining member 30 from the bottom) comes into contact with the rear lower inclined surface 54d of the right wall 53. Thus, in the initial states indicated by the solid lines of FIG. 2, the optical connector retaining members 30 are inclined such that lower sides thereof are in front of upper sides thereof.

<Rotating Member>

As shown in FIG. 1, in one or more embodiments, the rotating members 60 are knobs provided on the right extending pieces 32R of the optical connector retaining members 30. The rotating members 60 include disk-shaped coupling sections 61 coupled to the right extending pieces 32R of the optical connector retaining members 30 (to be specific, engaged with through holes (not shown) of the right extending pieces 32R), left shafts 62 joined to left surfaces of the coupling sections 61, extending to the left along the central axes CL, and rotatably inserted into the through holes 53h (refer to FIG. 2) of the right wall 53 of the bracket 50, right shafts 63 joined to right surfaces of the coupling sections 61 and extending to the right along the central axes CL, and enlarged diameter sections 64 joined to right ends of the right shafts 63 and larger in diameter than the right shafts 63.

With such a constitution, the optical connector retaining members 30 can be rotated around the central axes CL with respect to the bracket 50 by manually operating the rotating members 60.

<Reflecting Section>

In one or more embodiments, the reflecting section 40 is a reflecting film obtained by forming a metallic material such as aluminum and silver on the entire front surface of the rear wall 51 of the bracket 50 using evaporation or the like. The reflecting section 40 may be a reflecting sheet bonded to a front surface of the rear wall 51. Furthermore, the reflecting section 40 may be a reflecting surface obtained by performing mirror polishing on the front surface (a metal plate surface) of the rear wall 51 of the bracket 50.

As shown in FIG. 2, in the reflecting section 40, visible light (wavelengths of 400 nm to 750 nm) emitted from a distal end of one of the optical fibers 10 after led into a proximal end of the optical fiber 10 opposite to the distal end thereof having an optical connector 11 can be reflected. In the optical connector 11 engaged with a connector engagement section 31 of one of the optical connector retaining members 30, an inclination angle with respect to the front surface of the rear wall 51 varies according to the rotation of the optical connector retaining member 30 with respect to the bracket 50. Furthermore, an incident angle of outgoing light from the distal end of the optical fiber 10 provided in the optical connector 11 engaged with the connector engagement section 31 with respect to the reflecting section 40 also varies according to the rotation of the optical connector retaining member 30 with respect to the bracket 50.

In the optical connector retaining unit 1, the outgoing light from the distal end of the optical fiber 10 is reflected to a front surface side (hereinafter also referred to as a "unit front surface side") of the rear wall 51a by the reflecting section 40 by rotating the optical connector retaining member 30 with respect to the bracket 50 and changing an incident angle of the outgoing light from the distal end of the optical fiber 10 provided in the optical connector 11 (hereinafter also referred to as "outgoing light from a distal end of the optical connector 11") with respect to the reflecting section 40, and thus an operator on the unit front surface side can easily perform visual recognition.

In order for the operator on the unit front surface side to be able to easily visually recognize light from the outgoing light from the distal end of the optical connector 11 reflected by the reflecting section 40, it is desirable that the reflecting section 40 reflects the outgoing light from the distal end of the optical connector 11 at an inclination angle A of 45 degrees or less with respect to an optical axis C1. The reflecting section 40 of the rear wall 51 can reflect the outgoing light from the distal end of the optical connector 11 at an inclination angle A of 45 degrees or less with respect to the optical axis C1. Furthermore, in order for the operator on the unit front surface side to be able to easily visually recognize the light (reflected light) from the outgoing light from the distal end of the optical connector 11 reflected by the reflecting section 40, it is necessary to prevent the reflected light from the reflecting section 40 from impinging on the optical connector 11 engaged with the connector engagement section 31 of the optical connector retaining member 30.

In the optical connector retaining unit 1, an angle of incidence of the outgoing light from the distal end of the optical connector 11 with respect to the reflecting section 40 can be adjusted by rotating the optical connector retaining member 30 with respect to the bracket 50 so that the outgoing light from the distal end of the optical connector 11 can be reflected at the reflecting section 40 at the inclination angle A of 45 degrees or less with respect to the optical axis C1 and the reflected light from the reflecting section 40 can be prevented from hitting the optical connector 11 engaged with the optical connector retaining member 30.

In one or more embodiments, the visible light is red light. For example, a red laser beam with a wavelength of 635 nm to 690 nm may be used as the red light. The central axis CL extends in a direction intersecting the optical axis C1. In one or more embodiments, the central axis CL extends in a direction (the rightward and leftward direction) which is perpendicular to the optical axis C1.

In a rotational state indicated by an alternate long and two short dashed line of FIG. 2, the upper end of the fourth optical connector retaining member 30 from the top (the first optical connector retaining member 30 from the bottom) is away from the rear lower inclined surface 54d. Here, the rotational state refers to a stopped state after the optical connector retaining member 30 is rotated around the rotating axis CL with respect to the bracket 50. In the rotational state indicated by the alternate long and two short dashed line of FIG. 2, the fourth optical connector retaining member 30 from the top (the first optical connector retaining member 30 from the bottom) is set to be rotated around the rotating axis CL with respect to the bracket 50 to be inclined slightly forward and downward with respect to a horizontal direction.

In the rotational state indicated by the alternate long and two short dashed line of FIG. 2, the reflecting section 40 reflects visible light emitted from a distal end of an optical fiber at an inclination angle A of 45 degrees or less with respect to an the optical axis C1. In FIG. 2, since each of the optical connector retaining members 30 is inclined slightly forward and downward with respect to the horizontal direction, reflected light from visible light emitted from the distal end of the optical fiber 10 reflected at the reflecting section 40 is inclined slightly forward and upward with respect to the horizontal direction to just avoid an upper end on the distal end of the optical connector 11. Thus, an observer can easily visually recognize reflected light emitted from the distal end of the optical fiber 10 and reflected by the reflecting section 40. In FIG. 2, an optical axis of reflected light emitted from the distal end of the optical fiber 10 and reflected by the reflecting section 40 is indicated by reference symbol C2.

However, reflected light emitted from the distal end of the optical fiber 10 and reflected by the reflecting section 40 may be blocked by another optical connector retaining member 30 depending on a posture (an inclined posture) of the optical connector retaining member 30 and thus the reflected light may not be able to be easily visually recognized in some cases. In this case, the other optical connector retaining member 30 may be rotated around the rotating axis CL with respect to the bracket 50.

In an example of FIG. 2, a state in which a third optical connector retaining member 30 from the top (a second optical connector retaining member 30 from the bottom) is rotated around the rotating axis CL with respect to the bracket 50 to be inclined slightly forward and downward with respect to the horizontal direction is indicated by an alternate long and two short dashed line. Thus, since reflected light emitted from the distal end of the optical fiber 10 in the optical connector 11 retained in the fourth optical connector retaining member 30 from the top (the first optical connector retaining member 30 from the bottom) reflected by the reflecting section 40 is not blocked by a third optical connector retaining member 30 from the top (a second optical connector retaining member 30 from the bottom), the reflected light can be easily visually recognized.

<Procedure for Performing Fiber Identification>

Next, an example of a procedure for performing fiber identification using the optical connector retaining unit 1 according to one or more embodiments will be described with reference to FIGS. 3 and 4.

Figure 3:
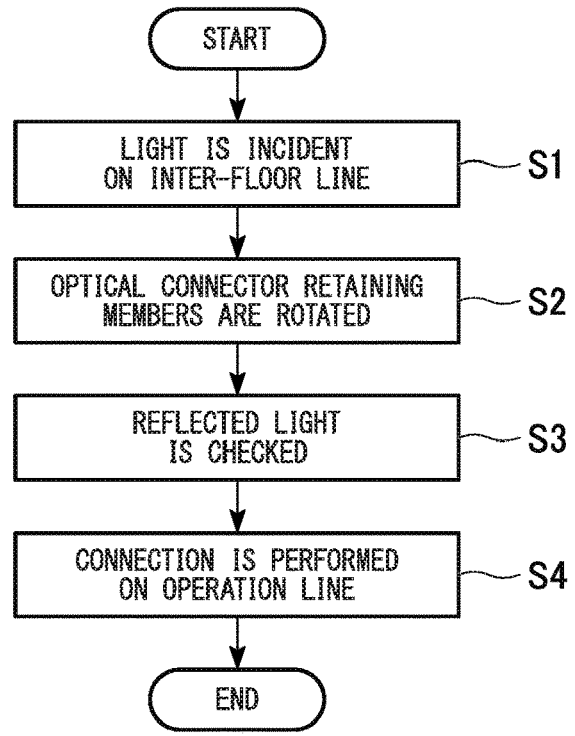
FIG. 3 is a flowchart showing a procedure of performing fiber identification using an optical connector retaining unit according to one or more embodiments.

First, light is made incident on an inter-floor line (Step S1 shown in FIG. 3).

Figure 4:
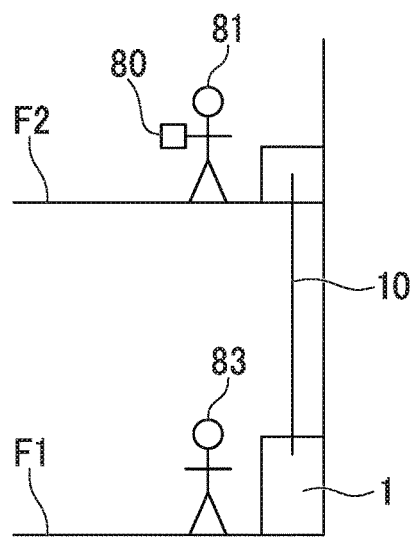
FIG. 4 is a schematic diagram showing an example of an inter-floor line.

As shown in FIG. 4, an operator 81 (hereinafter referred to as a "second floor side operator 81") holding a red laser beam source 80 is on standby on a second floor F2. The second floor side operator 81 sends red light (visible light) from a proximal end side of the optical fibers 10 (to be specific, proximal ends of optical fibers 21 optically connected to proximal ends of the optical fibers 10; refer to FIG. 10) using the red laser beam source 80. Red light sent from the proximal ends of the optical fibers 10 is emitted from the distal ends of the optical fibers 10 extending toward the optical connector retaining unit 1 placed on a first floor F1.

An operator 83 (hereinafter referred to as a "first floor side operator 83") in front of the optical connector retaining unit 1 is on standby on the first floor F1. The first floor side operator 83 checks that red light is emitted from the distal ends of the optical fibers 10.

First, as shown in FIG. 1, the optical connector retaining members 30 are rotated with respect to the bracket 50 (Step S2 shown in FIG. 3). For example, knobs 60 are caused to be rotated around the retaining member rotating axes CL. Thus, the optical connector retaining members 30 are set to be inclined slightly forward and downward with respect to the horizontal direction (refer to FIG. 2).

Subsequently, reflected light is checked (Step S3 shown in FIG. 3). To be specific, the first floor side operator 83 checks reflected light emitted from the distal ends of the optical fibers 10 and reflected by the reflecting section 40. As described above, the optical connector retaining members 30 are set to be inclined slightly forward and downward with respect to the horizontal direction so that the reflected light can be easily visually recognized.

Also, connection is performed on an operation line (Step S4 shown in FIG. 3). For example, the first floor side operator 83 inserts and engages optical connectors 11 of distal ends of optical fibers 10 in which the reflected light has been checked into optical connector adapters 111 of adapter array sections 110 (refer to FIG. 10) which will be described below. Thus, the optical connectors 11 of the distal ends of the optical fibers 10 are connector-connected (optically connected) to other optical fibers (not shown) in the optical connector adapters 111.

As described above, the optical connector retaining unit 1 according to one or more embodiments includes the optical connector retaining member 30 configured to retain the optical connector 11 of the distal end of the optical fiber 10 in the connection standby state being optically connected to nothing and the reflecting section 40 capable of reflecting visible light, which is emitted from the distal end of the optical fiber after led into a proximal end of the optical fiber opposite to the distal end thereof provided with the optical connector, at the inclination angle A of 45 degrees or less with respect to the optical axis C1.

With such a constitution, reflected light obtained by reflecting visible light led into the proximal end of the optical fiber 10 and emitted from the distal end of the optical fiber 10 by the reflecting section 40 can be used for fiber identification. A much larger amount of outgoing light (visible light) from the distal end of the optical fiber 10 can be secured than that of light leaking from the fiber connection sections of the optical connectors disclosed in Patent Documents 1 and 2. For this reason, in the optical connector retaining unit 1 according to one or more embodiments of the present invention the visibility of control light emitted from the optical connector 11 can be improved as compared to constitutions in which light leaking from the fiber connection sections is visually recognized outside of connector casings like in Patent Documents 1 and 2 and thus fiber identification can be reliably and easily performed.

Also, the bracket 50 provided with the reflecting section 40 (to be specific, the rear wall 51 in the bracket 50) is further provided and thus the optical connector retaining member 30 can be rotated around the rotating axis CL with respect to the bracket 50 in the direction which is perpendicular to the optical axis C1. Thus, the optical connector retaining member 30 can be rotated to a desired posture so that reflected light obtained by reflecting visible light emitted from the distal end of the optical fiber 10 by the reflecting section 40 is not blocked by optical connectors 11. Therefore, the visibility of control light emitted from the optical connector 11 can be further improved and thus fiber identification can be more reliably and more easily performed.

The plurality of connector engagement sections 31, with which the optical connectors 11 of the distal ends of the optical fibers 10 are engaged, are arranged on the optical connector retaining members 30 along the retaining member rotating axes CL. Thus, since the plurality of connector engagement sections 31 are grouped such that they fall within vertical widths, vertical lengths of the optical connector retaining members 30 are made compact. In addition, a plurality of (twelve in one or more embodiments) connector engagement sections 31 can be easily visually recognized from the front. Since the plurality of connector engagement sections 31 can be rotated together by rotating the optical connector retaining members 30 around the rotating axes CL with respect to the bracket 50, workability of fiber identification can be further improved. When conducting fiber identification, since the plurality of connector engagement sections 31 in the optical connector retaining members 30 have previously been made empty and then the optical connectors 11 of the distal ends of the optical fibers 10 are engaged with predetermined connector engagement sections 31, control light emitted from the optical connectors 11 can be easily visually recognized, the visibility of control light can be more further improved and thus fiber identification can be more reliably and more easily performed.

Also, a plurality of optical connector retaining members 30 are provided, and the plurality of optical connector retaining members 30 are provided such that the rotating axes CL thereof extend parallel to each other at intervals in the upward and downward direction.

Thus, since the plurality of optical connector retaining members 30, the vertical lengths of which are made compact, are grouped such that they fall within the left to right direction width, the vertical width and the left to right direction width of the optical connector retaining unit 1 can make compact. In addition, a plurality of (12 rows×4 rows) connector engagement sections 31 can be easily visually recognized from the front.

Although a case in which the optical connector retaining members 30 are formed of a transparent member such as a transparent resin has been described as an example, the present invention is not limited thereto. For example, the optical connector retaining members 30 may be light shielding connector retaining members formed of a light shielding member such as a black resin. Even in this case, since light shielding connector retaining members can be rotated to a desired posture so that reflected light obtained by reflecting visible light emitted from the distal ends of the optical fibers 10 by the reflecting section 40 is not blocked by the optical connector retaining members 30, the visibility of control light emitted from the optical connectors 11 can be improved and thus fiber identification can be reliably and easily performed.

First Modified Example

A first modified example will be described below.

Although a case in which the reflecting section 40 capable of reflecting visible light emitted from the distal end of the optical fiber 10 at the inclination angle A of 45 degrees or less with respect to the optical axis C1 is provided has been described as an example in the above-described embodiments, the present invention is not limited thereto.

Figure 5:
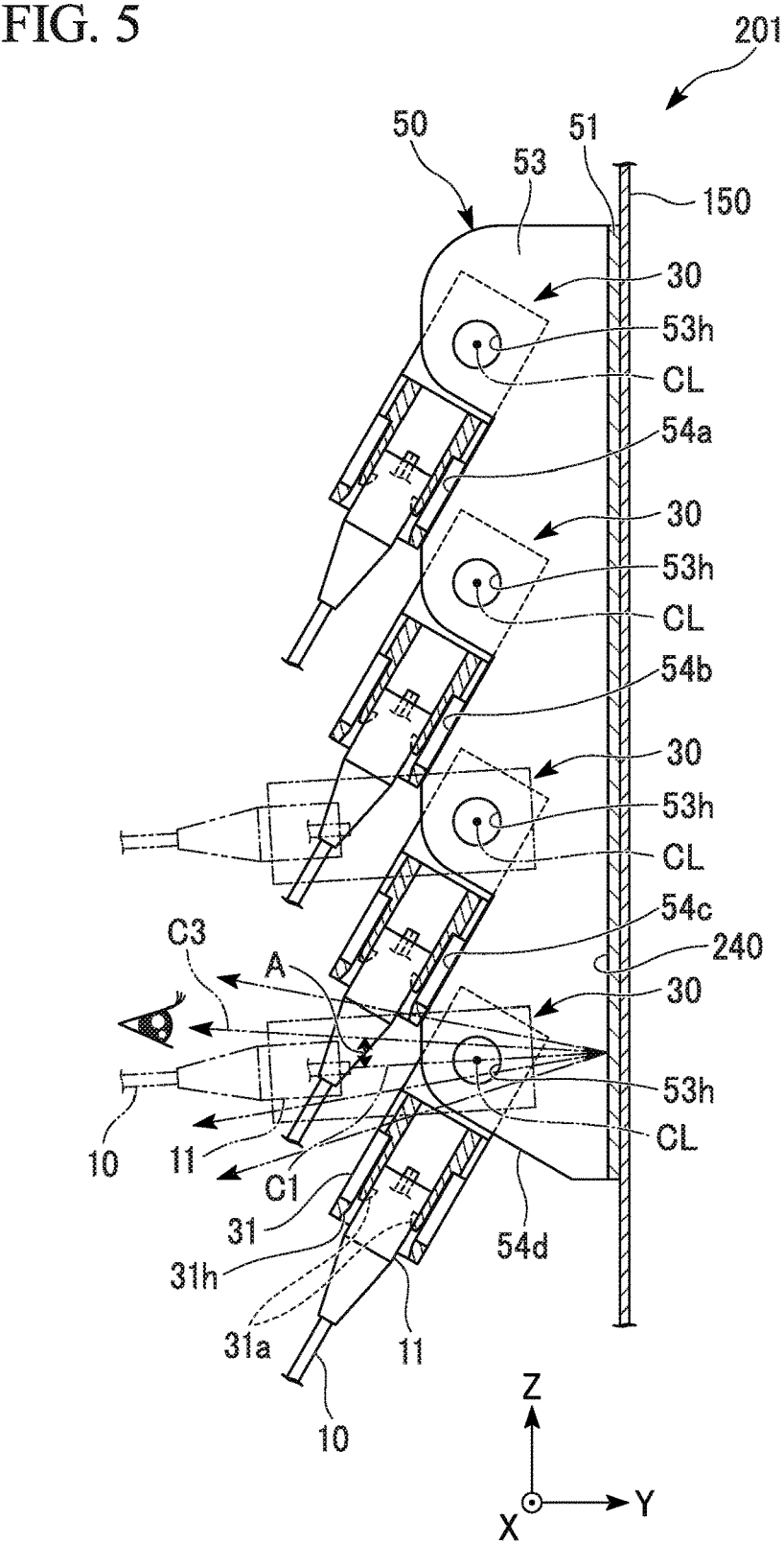
FIG. 5 is a diagram showing a cross section corresponding to FIG. 2 of the optical connector retaining unit according to a first modified example of one or more embodiments and a diagram showing an action of a scattering section.

In FIG. 5, constituent elements the same as those of the embodiments will be denoted with the same reference numerals and detailed description thereof will be omitted.

As shown in FIG. 5, an optical connector retaining unit 201 may include a scattering section 240 configured to scatter visible light emitted from a distal end of an optical fiber 10 such that scattered light includes light within an inclination angle A of 45 degrees or less with respect to an optical axis C1.

In the first modified example, the scattering section 240 is a light diffusing sheet bonded to a front surface of a rear wall 51. In the first modified example, the rear wall 51 functions as an optical path changing section supporting member provided with the scattering section 240. The scattering section 240 may have an irregular structure formed by forming fine irregularities in the front surface of the rear wall 51.

In a rotational state indicated by an alternate long and two short dashed line of FIG. 5, a fourth optical connector retaining member 30 from the top (a first optical connector retaining member 30 from the bottom) is set to be rotated around a rotating axis CL with respect to a bracket 50 to be inclined slightly forward and downward with respect to a horizontal direction.

In the rotational state indicated by the alternate long and two short dashed line of FIG. 5, the scattering section 240 scatters visible light emitted from the distal end of the optical fiber 10 such that scattered light includes light within an inclination angle A of 45 degrees or less with respect to the optical axis C1. In FIG. 5, since the optical connector retaining member 30 is inclined slightly forward and downward with respect to the horizontal direction, scattered light obtained by scattering visible light emitted from the distal end of the optical fiber 10 by the scattering section 240 is inclined slightly forward and upward and slightly forward and downward with respect to the horizontal direction to just avoid a distal end (to be specific, a distal end side upper end or a distal end side lower end) of an optical connector 11. Thus, the observer can easily visually recognize scattered light emitted from the distal end of the optical fiber 10 and scattered by the scattering section 240. In FIG. 5, one of optical axes of scattered light emitted from the distal end of the optical fiber 10 and scattered by the scattering section 240 is indicated by reference symbol C3.

However, scattered light emitted from the distal end of the optical fiber 10 and scattered by the scattering section 240 may be blocked by another optical connector retaining member 30 depending on a posture (an inclined posture) of the optical connector retaining member 30 and thus the scattered light may not be able to be easily visually recognized in some cases. In this case, the other optical connector retaining member 30 may be rotated around the rotating axis CL with respect to the bracket 50.

In an example of FIG. 5, a state in which a third optical connector retaining member 30 from the top (a second optical connector retaining member 30 from the bottom) is rotated around the rotating axis CL with respect to the bracket 50 to be inclined slightly forward and downward with respect to the horizontal direction is indicated by an alternate long and two short dashed line. Thus, since scattered light emitted from the distal end of the optical fiber 10 in the optical connector 11 retained in a fourth optical connector retaining member 30 from the top (a first optical connector retaining member 30 from the bottom) and scattered by the scattering section 240 is not blocked by the third optical connector retaining member 30 from the top (the second optical connector retaining member 30 from the bottom), the scattered light can be easily visually recognized.

The optical connector retaining unit 201 of the first modified example includes the scattering section 240 configured to scatter visible light emitted from the distal end of the optical fiber 10 such that scattered light includes light within the inclination angle A of 45 degrees or less with respect to the optical axis C1.

With such a constitution, scattered light obtained by scattering visible light led into a proximal end of the optical fiber 10 and emitted from the distal end of the optical fiber 10 by the scattering section 240 can be used for fiber identification. Outgoing light (visible light) from the distal end of the optical fiber 10 can secure a much larger amount of light intensities than those of light leaking from the fiber connection sections of the optical connectors disclosed in Patent Documents 1 and 2. For this reason, the optical connector retaining unit 201 according to an aspect of the present invention can improve visibility of control light emitted from the optical connectors 11 as compared to constitutions in which light leaking from the fiber connection sections is visually recognized outside of connector casings like in Patent Documents 1 and 2 and can thus reliably and easily perform fiber identification.

Second Modified Example

A second modified example will be described below.

Although a case in which the optical connector retaining member 30 can be rotated around the rotating axis CL with respect to the bracket 50 has been described in the above-described embodiments, the present invention is not limited thereto.

Figure 6:
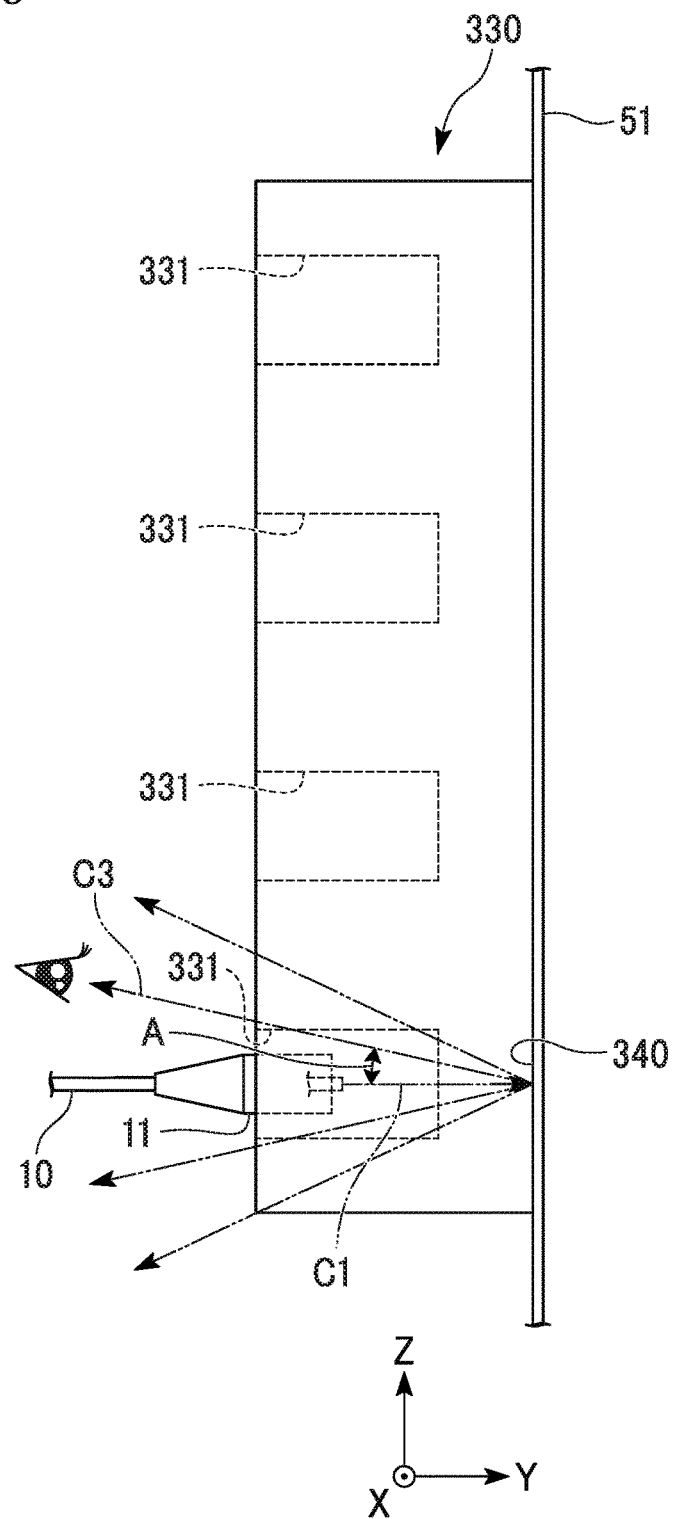
FIG. 6 is a side view of an optical connector retaining unit according to a second modified example of one or more embodiments and a diagram showing an action of a scattering section.

In FIG. 6, constituent elements the same as those of the embodiments will be denoted with the same reference numerals and a detailed description thereof will be omitted.

As shown in FIG. 6, an optical connector retaining member 330 may be a light transmitting connector retaining member formed to be able to transmit visible light emitted from a distal end of an optical fiber 10 and in which a connector engagement hole 331 with which an optical connector 11 is engaged is formed.

In the second modified example, the optical connector retaining member 330 is formed of a transparent member such as a transparent resin. In the second modified example, four connector engagement holes 331 are formed in the light transmitting connector retaining member 330. The four connector engagement holes 331 are provided such that long axes thereof extend to be parallel to each other at intervals in the upward and downward direction. A locking claw (not shown) engaged with the optical connector 11 to be able to be attached and detached is provided in the connector engagement hole 331 like in the above-described connector engagement section 31.

A scattering section 340 is provided on a rear surface side of the light transmitting connector retaining member 330 and on an optical axis C1. For example, the scattering section 340 may be a light diffusing sheet bonded to a front surface of a rear wall 51. In the second modified example, the rear wall 51 functions as an optical path changing section supporting member provided with the scattering section 340. The scattering section 340 may have an irregular structure formed by forming fine irregularities in the front surface of the rear wall 51.

The light transmitting connector retaining member 330 of the second modified example is the light transmitting connector retaining member formed to be able to transmit visible light emitted from the distal end of the optical fiber 10 and formed with the connector engagement hole 331 with which the optical connector 11 is engaged, and the scattering section 340 is provided on the rear surface side of the light transmitting connector retaining member 330 and on the optical axis C1.

With such a constitution, since transmitted light transmitted through the light transmitting connector retaining member 330 in scattered light obtained by scattering visible light led into a proximal end of the optical fiber 10 and emitted from the distal end of the optical fiber 10 by the scattering section 340 can be visually recognized, the transmitted light can be used for fiber identification. In addition, since it takes little time and takes little effort to perform a rotating motion as compared to a constitution in which the optical connector retaining member 30 is rotated to a desired posture (refer to FIG. 2), the transmitted light can be easily visually recognized. Therefore, visibility of control light emitted from the optical connector 11 can be improved and thus fiber identification can be reliably and more further easily performed. In addition, since the scattering section 340 may be adopted as long as the scattering section 340 is provided on at least the optical axis C1, an installation area of the scattering section 340 can be reduced as compared to a case in which a scattering section is provided on the entire front surface of the rear wall 51 and thus a reduction in manufacturing costs can be achieved.

Third Modified Example

A third modified example will be described below.

Although a case in which the scattering section 340 is provided on the rear surface side of the light transmitting connector retaining member 330 and on the optical axis C1 has been described as an example in the second modified example, the present invention is not limited thereto.

Figure 7:
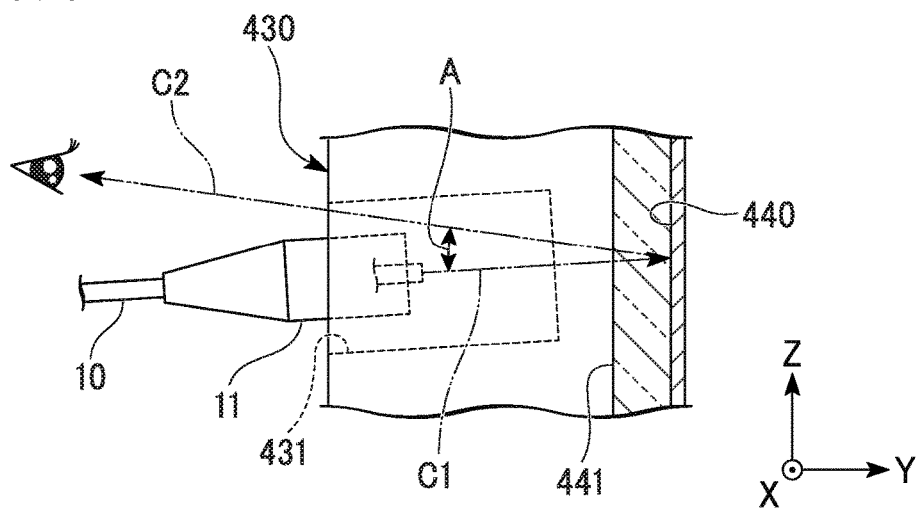
FIG. 7 is a main part side view of an optical connector retaining unit according to a third modified example of one or more embodiments and a diagram showing an action of a reflecting section.

In FIG. 7, the same constituent elements as those of the previously described embodiments will be denoted with the same reference numerals and a detailed description thereof will be omitted.

As shown in FIG. 7, a reflecting section 440 may be provided on a rear surface side of a light transmitting connector retaining member 430 and on an optical axis C1.

For example, the reflecting section 440 is a metal film provided on the rear surface side of the light transmitting connector retaining member 430. To be specific, a transparent substrate 441 formed to be able to transmit visible light is provided on the rear surface of the light transmitting connector retaining member 430. For example, the transparent substrate 441 is a glass plate or a transparent resin plate. The metal film as the reflecting section 440 is formed on a rear surface of the transparent substrate 441 through evaporation or the like. In the third modified example, the transparent substrate 441 functions as an optical path changing section supporting member provided with the reflecting section 440. The reflecting section 440 may be a reflecting sheet bonded to the rear surface of the transparent substrate 441 and may be a metal plate obtained by bonding a mirror-polished front surface (a mirror-polished surface) to the rear surface of the transparent substrate 441.

In the third modified example, a connector engagement hole 431 is provided such that a long axis thereof is inclined gently forward and downward. To be specific, the connector engagement hole 431 is inclined gently with respect to a horizontal direction such that a front side thereof is below a rear side thereof.

The optical connector retaining member 430 of the third modified example is a light transmitting connector retaining member formed to be able to transmit visible light emitted from a distal end of an optical fiber 10 and formed with the connector engagement hole 431 with which an optical connectors 11 is engaged, and the reflecting section 440 is provided on the rear surface side of the light transmitting connector retaining member 430 and on the optical axis C1.

With such a constitution, since transmitted light transmitted through the light transmitting connector retaining member 430 in reflected light obtained by reflecting visible light led into a proximal end of the optical fiber 10 and emitted from the distal end of the optical fiber 10 by the reflecting section 440 can be visually recognized, the transmitted light can be used for fiber identification. In addition, since it takes little time and takes little effort to perform a rotating motion as compared to the constitution in which the optical connector retaining member 30 is rotated to the desired posture (refer to FIG. 2), the transmitted light can be easily visually recognized. Therefore, visibility of control light emitted from an optical connector 11 can be improved and thus fiber identification can be reliably and more further easily performed. In addition, since the reflecting section 440 may be adopted as long as the reflecting section 440 is provided on at least the optical axis C1, an installation area of the reflecting section 440 can be reduced as compared to a case in which a reflecting section is provided on the entire front surface of the rear wall 51 and thus a reduction in manufacturing costs can be achieved.

Fourth Modified Example

A fourth modified example will be described below.

Although a case in which the reflecting section 440 is provided on the rear surface side of the light transmitting connector retaining member 430 and the metal plate having the mirror-polished front surface is provided has been described in the third modified example, the present invention is not limited thereto.

Figure 8:
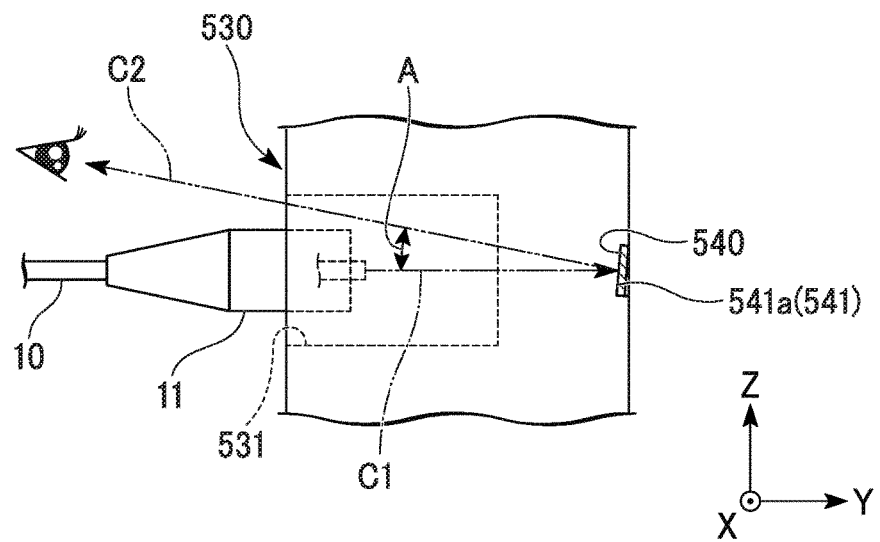
FIG. 8 is a main part side view of an optical connector retaining unit according to a fourth modified example of one or more embodiments and a diagram showing an action of a reflecting section.

In FIG. 8, the same constituent elements as those of the previously described embodiments will be denoted with the same reference numerals and a detailed description thereof will be omitted. Since a connector engagement hole 531 of the fourth modified example has the same constitution as the connector engagement hole 331 of the second modified example, a detailed description thereof will be omitted.

As shown in FIG. 8, a reflecting section 540 may be provided inside a light transmitting connector retaining member 530 and on an optical axis C1.

For example, the reflecting section 540 is a metal plate which is provided in the light transmitting connector retaining member 530 and on the optical axis C1 and has a mirror-polished front surface. To be specific, a concave section 541 having an inclined surface 541a inclined forward and downward is formed in a rear surface of the light transmitting connector retaining member 530. The mirror polished surface (the front surface) of the reflecting section 540 is bonded to the inclined surface 541a of the concave section 541. In the fourth modified example, the inclined surface 541a of the concave section 541 functions as an optical path changing section supporting member provided with the reflecting section 540. The reflecting section 540 may be a reflecting sheet bonded to the inclined surface 541a of the concave section 541.

The optical connector retaining member 530 of the fourth modified example is a light transmitting connector retaining member formed to be able to transmit visible light emitted from a distal end of an optical fiber 10 and formed with a connector engagement hole 531 with which an optical connector 11 is engaged, and the reflecting section 540 is provided in the light transmitting connector retaining member 530 and on the optical axis C1.

With such a constitution, since transmitted light transmitted through the light transmitting connector retaining member 530 in reflected light obtained by reflecting visible light led into a proximal end of the optical fiber 10 and emitted from the distal end of the optical fiber 10 by the reflecting section 540 can be visually recognized, the transmitted light can be used for fiber identification. In addition, since it takes little time and takes little effort to perform a rotating motion as compared to the constitution in which the optical connector retaining member 30 is rotated to the desired posture (refer to FIG. 2), the transmitted light can be easily visually recognized. Therefore, visibility of control light emitted from the optical connector 11 can be improved and thus fiber identification can be reliably and more further easily performed. In addition, since the reflecting section 540 may be adopted as long as the reflecting section 540 is provided on at least the optical axis C1, an installation area of the reflecting section 540 can be reduced as compared to a case in which a reflecting section is provided on the entire rear surface of the light transmitting connector retaining member 530 and thus a reduction in manufacturing costs can be achieved. In addition, a support substrate of the reflecting section 440 such as the transparent substrate 441 is not required in contrast to a constitution in which the reflecting section 440 is provided on the rear surface side of the light transmitting connector retaining member 430 (refer to FIG. 7). In addition, an installation space of the reflecting section 540 may be adopted as long as the concave section 541 is locally formed on the rear surface of the light transmitting connector retaining member 530 and on the optical axis C1. Therefore, a reduction in manufacturing costs can be achieved while a forward and rearward width of an optical connector retaining unit is made more compact as compared to the constitution in which the reflecting section 440 is provided on the rear surface side of the light transmitting connector retaining member 430 (refer to FIG. 7).

Fifth Modified Example

A fifth modified example will be described below.

Although a case in which the scattering section 340 is provided on the rear surface side of the light transmitting connector retaining member 330 and on the optical axis C1 in the second modified example, the present invention is not limited thereto.

Figure 9:
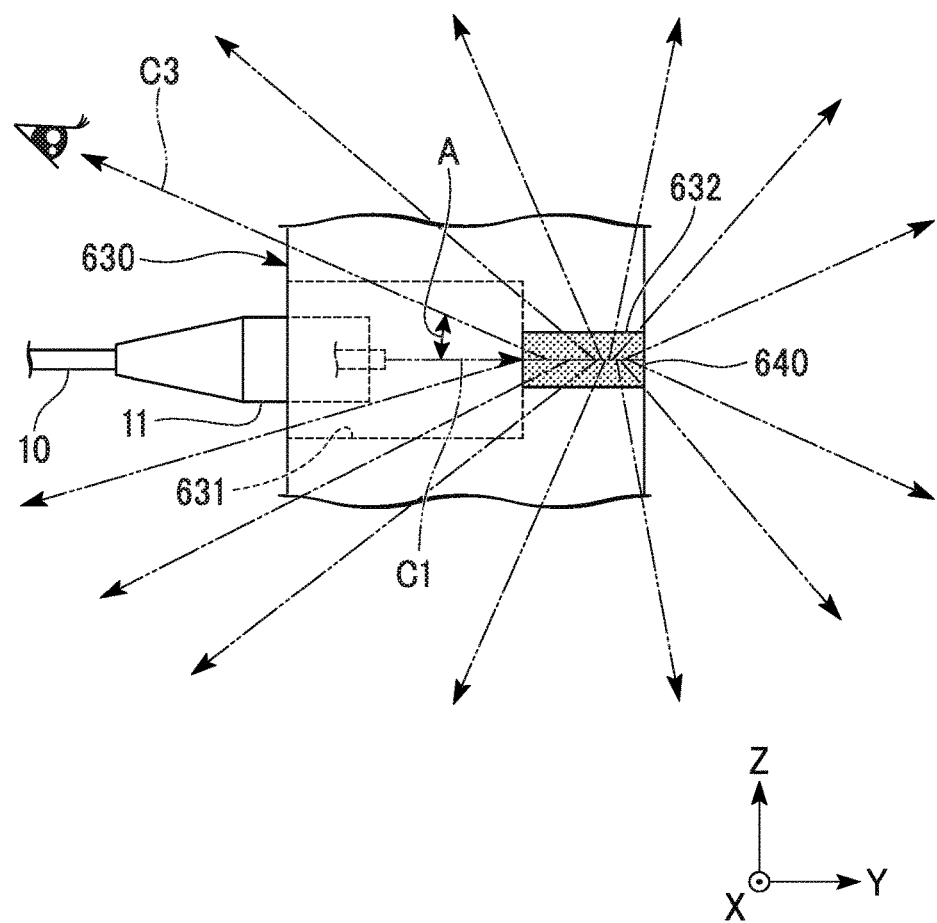
FIG. 9 is a side view of an optical connector retaining unit according to a fifth modified example of one or more embodiments and a diagram showing an action of a scattering section.

In FIG. 9, the same constituent elements as those of the previously described embodiments will be denoted with the same reference numerals and a detailed description thereof will be omitted. Since a connector engagement hole 631 of the fifth modified example has the same constitution as the connector engagement hole 331 of the second modified example, a detailed description thereof will be omitted.

As shown in FIG. 9, a scattering section 640 may be provided inside a light transmitting connector retaining member 630 and on an optical axis C1.

The connector engagement hole 631 of the light transmitting connector retaining member 630 shown in FIG. 9 is a non-through hole in which a rear surface side (a rear side) of the light transmitting connector retaining member 630 is blocked by a part of the light transmitting connector retaining member 630. Hereinafter, a wall of the light transmitting connector retaining member 630 located on a rear side of the connector engagement hole 631 is also referred to as a "rear wall 632."

For example, the scattering section 640 is a part (a region) in which a plurality of particles for scattering light in the rear wall 632 of the light transmitting connector retaining member 630 are mixed and dispersed. The scattering section 640 is provided in the light transmitting connector retaining member 630 and on the optical axis C1. In other words, the scattering section 640 is provided in the rear wall 632 of the connector engagement hole 631 in the light transmitting connector retaining member 630. In the rear wall 632, the scattering section 640 is formed on the optical axis C1, that is, in a position in which the optical axis C1 of outgoing light from a distal end of an optical fiber 10 of an optical connector 11 inserted into and engaged with the connector engagement hole 631 passes through the scattering section 640. In FIG. 9, the scattering section 640 is formed in a position in which the optical axis C1 passes through a central portion thereof.

The plurality of particles are uniformly dispersed in the rear wall 632 of the connector engagement hole 631. In the fifth modified example, the rear wall 632 of the connector engagement hole 631 functions as an optical path changing section supporting member provided with the scattering section 640.

The optical connector retaining member 630 of the fifth modified example is a light transmitting connector retaining member formed to be able to transmit visible light emitted from the distal end of the optical fiber 10 and formed with the connector engagement hole 631 with which the optical connector 11 is engaged, and the scattering section 640 is provided in the light transmitting connector retaining member 630 and on the optical axis C1.

With such a constitution, since transmitted light transmitted through the light transmitting connector retaining member 630 in scattered light due to scattering visible light led into a proximal end of the optical fiber 10 and emitted from the distal end of the optical fiber 10 by the scattering section 640 can be visually recognized, the transmitted light can be used for fiber identification. In addition, the transmitted light can be visually recognized without performing a rotating operation in contrast to the constitution in which the optical connector retaining member 30 is rotated to the desired posture (refer to FIG. 2) and thus fiber identification can be easily performed. A plurality of scattering sections 640 of the fifth modified example is provided to correspond to a plurality of connector engagement holes 631 of the light transmitting connector retaining member 630. Furthermore, in the fifth modified example, a position of a scattering section can be brought close to the optical connector 11 inserted into and engaged with the connector engagement hole 631 in contrast to a constitution in which a scattering section is provided on the rear surface side of the light transmitting connector retaining member 630. For this reason, in the fifth modified example, generation of scattered light from the scattering section 640 is visually recognized so that an optical fiber 10 which has irradiated a scattering section 640, which has generated scattered light, with outgoing light (alternatively, an optical connector 11 provided on a distal end of the optical fiber 10) can be simply identified and thus fiber identification can be easily performed. In addition, in the fifth modified example, scattered light is generated from a whole part of the scattering section 640 located on an optical path of outgoing light from the distal end of the optical fiber 10 of the optical connector 11 so that an optical path of outgoing light from the distal end of the optical fiber 10 can also be visually ascertained. Therefore, fiber identification can be performed even when an optical path of outgoing light from the distal end of the optical fiber 10 is visually recognized using scattered light of the scattering section 640.

The optical connector retaining unit according to one or more embodiments of the present invention can also adopt a constitution in which the connector engagement hole 31h which is open on the front surface side of the optical connector retaining member 30 of one or more embodiments of FIG. 2 is set to be a non-through hole in which the connector engagement hole 31h is blocked by the scattering section provided on the rear side thereof. In the case of such a constitution, all or a part of scattered light obtained by scattering outgoing light from the distal end of the optical fiber 10 provided with the optical connector 11 inserted into and engaged with the connector engagement hole 31h by the scattering section is set to be emitted in front of a unit from a light transmission optical connector retaining member. Thus, since the operator in front of the unit visually recognizes scattered light from the scattering section of the optical connector retaining member, fiber identification can be performed without rotating the optical connector retaining member.

<Entire Optical Wiring Unit>

Figure 10:
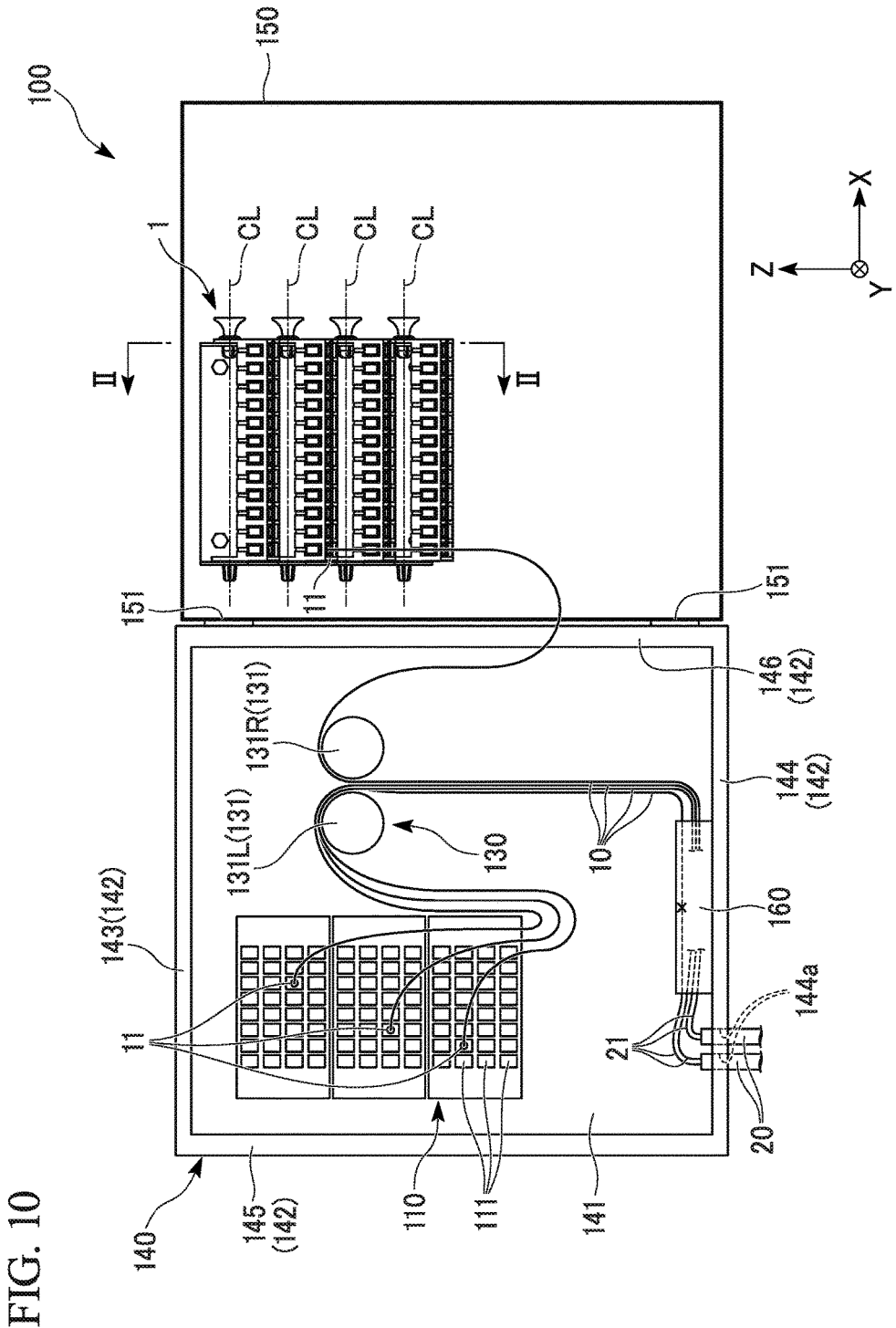
FIG. 10 is a schematic diagram of an optical connection box according to one or more embodiments.

FIG. 10 shows an optical connection box 100 including the optical connector retaining unit 1 as an example of an optical wiring unit. As shown in FIG. 10, the optical connection box 100 includes the optical connector retaining unit 1, the adapter array sections 110 in which a plurality of optical connector adapters 111 are arranged, a fiber guide section 130 having a pair of left and right guide posts 131, a casing 140 configured to accommodate the optical connector retaining unit 1, the adapter array sections 110, and the fiber guide section 130, and a lid part 150 which can open and close the front part of the casing 140. FIG. 10 shows a state in which the front part of the casing 140 is open.

<Casing>

The casing 140 has a rectangular box shape having a front part which is open. The casing 140 includes a rectangular rear plate 141 provided with the adapter array sections 110 and the fiber guide section 130 and a frame-shaped section 142 joined to an outer circumferential edge of the rear plate 141 and having a rectangular frame shape.

The frame-shaped section 142 includes an upper plate 143 having a plate shape with a length in a horizontal direction and a thickness in a vertical direction and joined to an upper end of the rear plate 141, a lower plate 144 having the same shape as the upper plate 143 and joined to a lower end of the rear plate 141, a left plate 145 having a plate shape with a length in the vertical direction and a thickness in the horizontal direction and joined to a left end of the rear plate 141, and a right plate 146 having the same shape as the left plate 145 and joined to a right end of the rear plate 141.

A plurality of cable insertion holes 144a through which optical fiber cables 20 are inserted are formed in the lower plate 144. A tray 160 configured to accommodate connection parts obtained by connecting (optically connecting) the optical fibers 21 drawn from the optical fiber cables 20 (hereinafter referred to as "cable-side optical fibers 21") and the optical fibers 10 serving as single-core optical fiber cords accommodating single-core optical fiber core wires to each other is placed on the lower plate 144.

<Lid Part>

The lid part 150 has a rectangular plate shape which is slightly smaller than an external form of the frame-shaped section 142. The lid part 150 is coupled to the frame-shaped section 142 through a pair of upper and lower hinge sections 151. The optical connector retaining unit 1 according to one or more embodiments is provided on the lid part 150.

<Adapter Array Section>

Each of the adapter array sections 110 is arranged on an upper portion of the rear plate 141 and near the left thereof. The optical connectors 11 provided on distal ends of the optical fibers 10 extending from the fiber guide section 130 are engaged with the optical connector adapters 111 of the adapter array section 110 and able to be inserted and removed. The optical fibers 10 extending from the optical connector retaining unit 1 are connector-connected (optically connected) to other optical fibers (not shown) in the optical connector adapters 111 by inserting and engaging the optical connectors 11 on the distal ends thereof into and with the optical connector adapters 111 of the adapter array section 110. In one or more embodiments, the optical connector adapters 111 are tubular members including locking claws (not shown) engaged with the optical connectors 11 and attached and detached therein.

Hereinafter, optical fibers 10 connector-connected (optically connected) to other optical fibers (not shown; communication optical fibers) by the optical connector adapters 111 of the adapter array section 110 among the optical fibers 10 extending from the fiber guide section 130 are also referred to as "operational optical fibers 10."

<Optical Connector Retaining Unit>

The optical connector retaining unit 1 is arranged on an upper portion of the lid part 150 and near the left thereof. The optical connector retaining member 30 is arranged at substantially the same height as the adapter array section 110.

<Fiber Guide Section>

The fiber guide section 130 includes a pair of left and right guide posts 131 (a left guide post 131L and a right guide post 131R) having a columnar shape with a long axis in a forward and rearward direction. In other words, the pair of left and right guide posts 131 is coupled to the rear plate 141 and extends forward from the rear plate 141. In one or more embodiments, the pair of left and right guide posts 131 is set to be able to support the optical fibers 10 in a curved state.

In one or more embodiments, optical fibers 10 supported by the left guide post 131L are directed to the adapter array section 110. In other words, the optical fibers 10 supported by the left guide post 131L function as the operational optical fibers 10.

On the other hand, optical fibers 10 supported by the right guide post 131R are directed to the optical connector retaining unit 1. In other words, the optical fibers 10 supported by the right guide post 131R function as the retained optical fibers 10.

FIG. 10 shows a state in which three optical fibers 10 are supported by the left guide post 131L and one optical fiber 10 is accommodated in the right guide post 131R.

As described above, since the optical connection box 100 according to one or more embodiments includes the optical connector retaining unit 1 and the adapter array sections 110 to which the optical connectors 11 of the distal ends of the operational optical fibers 10 extending from the fiber guide section 130 are connected, visibility of control light emitted from the optical connectors 11 can be improved and thus fiber identification can be reliably and easily performed.

The optical connection box 100 may also adopt a closure or the like in addition to an optical termination box.

Also, although a case in which an optical wiring unit is the optical connection box 100 has been described in the above-described embodiments, the present invention is not limited thereto. For example, an optical wiring unit may be an optical fiber wiring frame such as an optical wiring board.

Although a case in which the optical connector 11 of the distal end of the operational optical fiber 10 is connector-connected to a communication optical fiber in the adapter array section 110 has been described as an example in the above-described embodiments, the present invention is not limited thereto. For example, the optical fiber 10 extending from the fiber guide section 130 may be configured to be connector-connected to an optical fiber, to which test light is sent from an optical fiber line testing device, in the adapter array section 110.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical connector retaining unit comprising:
   an optical connector retaining member that retains an optical connector of a distal end of an optical fiber in a connection standby state being optically connected to nothing;
   a reflecting section that reflects visible light emitted from the distal end of the optical fiber after led into a proximal end of the optical fiber opposite to the distal end thereof provided with the optical connector, at an inclination angle of 45 degrees or less with respect to an optical axis of the emitted visible light, or a scattering section that scatters visible light emitted from the distal end of the optical fiber such that scattered light includes light within the inclination angle of 45 degrees or less with respect to the optical axis of the emitted visible light, and
   an optical path changing section supporting member comprising the reflecting section or the scattering section,
   wherein the optical connector retaining member is rotatable with respect to the optical path changing section supporting member around a central axis in a direction intersecting the optical axis.

2. The optical connector retaining unit according to claim 1, wherein
   a plurality of connector engagement sections with which optical connectors of distal ends of optical fibers are engaged and are arranged on the optical connector retaining member along the central axis.

3. The optical connector retaining unit according to claim 1, further comprising:
   a plurality of optical connector retaining members provided such that central axes of the plurality of optical connector retaining members extend to be parallel to each other at intervals in an upward and downward direction.

4. An optical connector retaining unit comprising:
   an optical connector retaining member that retains an optical connector of a distal end of an optical fiber in a connection standby state being optically connected to nothing; and
   a reflecting section that reflects visible light emitted from the distal end of the optical fiber after led into a proximal end of the optical fiber opposite to the distal end thereof provided with the optical connector, at an inclination angle of 45 degrees or less with respect to an optical axis of the emitted visible light, or a scattering section that scatters visible light emitted from the distal end of the optical fiber such that scattered light includes light within the inclination angle of 45 degrees or less with respect to the optical axis of the emitted visible light,
   wherein the optical connector retaining member is a light transmitting connector retaining member that transmits the visible light emitted from the distal end of the optical fiber and formed with a connector engagement hole with which the optical connector is engaged, and
   the reflecting section or the scattering section is provided inside the light transmitting connector retaining member or on the optical axis of a rear surface side of the light transmitting connector retaining member.

5. An optical wiring unit comprising:
   an optical connector retaining unit comprising:
      an optical connector retaining member that retains an optical connector of a distal end of an optical fiber in a connection standby state being optically connected to nothing; and
      a reflecting section that reflects visible light emitted from the distal end of the optical fiber after led into a proximal end of the optical fiber opposite to the distal end thereof provided with the optical connector, at an inclination angle of 45 degrees or less with respect to an optical axis of the emitted visible light, or a scattering section that scatters visible light emitted from the distal end of the optical fiber such that scattered light includes light within the inclination angle of 45 degrees or less with respect to the optical axis of the emitted visible light; and
   an adapter array section to which an optical connector of a distal end of an optical fiber not retained in the optical connector retaining unit is connected.

* * * * *